US007181258B2

(12) United States Patent
Lin et al.
(10) Patent No.: US 7,181,258 B2
(45) Date of Patent: Feb. 20, 2007

(54) WIRELESS COMMUNICATION DEVICE

(75) Inventors: Huei Lin, Tao Yuan Shien (TW); Nen-Yen Wu, Tao Yuan (TW)

(73) Assignee: Quanta Computer Inc., Tao Yuan Shien (TW)

(*) Notice: Subject to any disclaimer, the term of this patent is extended or adjusted under 35 U.S.C. 154(b) by 555 days.

(21) Appl. No.: 10/730,207

(22) Filed: Dec. 8, 2003

(65) Prior Publication Data

US 2004/0235432 A1 Nov. 25, 2004

(30) Foreign Application Priority Data

May 23, 2003 (TW) ............................. 92209503 U

(51) Int. Cl.
*H04M 1/00* (2006.01)

(52) U.S. Cl. .............................. 455/575.7; 455/575.1; 455/90.3; 455/575.5; 455/101; 455/66.1; 455/41.1; 455/562.1; 340/539.11; 340/539.19

(58) Field of Classification Search ............... 455/90.3, 455/66.1, 575.7, 575.5, 575.1, 101, 557, 455/562.1
See application file for complete search history.

(56) References Cited

U.S. PATENT DOCUMENTS 5,329,555 A * 7/1994 Marko et al. ............... 375/347
5,678,202 A * 10/1997 Filimon et al. .......... 455/575.7
5,977,917 A * 11/1999 Hirose ........................ 343/702
6,178,196 B1 * 1/2001 Naguib et al. .............. 375/148
6,181,916 B1 * 1/2001 Mou et al. .................. 455/572
6,211,830 B1 * 4/2001 Monma et al. ............. 343/702
6,456,248 B2 * 9/2002 Ito ............................ 343/702
6,529,746 B1 * 3/2003 Kotzin .................... 455/562.1
6,917,820 B2 * 7/2005 Gore et al. .............. 455/562.1
6,946,996 B2 * 9/2005 Koyama ............. 343/700 MS
7,079,816 B2 * 7/2006 Khorram et al. .............. 455/78
7,092,679 B2 * 8/2006 Khorram ..................... 455/78

* cited by examiner

*Primary Examiner*—Marceau Milord
(74) *Attorney, Agent, or Firm*—Thomas, Kayden, Horstemeyer & Risley

(57) ABSTRACT

A wireless communication device with an embedded dual-band antenna system. The wireless communication device has a body, a housing, a shielding unit, a first antenna unit, a second antenna unit and a control unit. The shielding unit, the first antenna unit and the second antenna unit are disposed in the body, and the shielding unit, the first antenna unit and the second antenna unit are enclosed by the housing. The second antenna unit is separated from the first antenna unit by the shielding unit. The first antenna unit transmits a first signal and the second antenna unit transmits a second signal respectively. In a predetermined interval, the first signal and the second signal are transmitted simultaneously.

20 Claims, 7 Drawing Sheets

WIRELESS COMMUNICATION DEVICE

BACKGROUND OF THE INVENTION

1. Field of the Invention

The present invention relates to a wireless communication device, and in particular to a wireless communication device with an embedded dual-band antenna system for transmitting signals simultaneously.

2. Description of the Related Art

For an embedded antenna of a wireless communication device, factors such as EMI, EMS, multi-path interference, shielding of a housing or an outer case of the communication device, etc., have to be properly considered. That is to say, the site of the antenna in a body of the communication device determines the radiation performance of the wireless communication device.

When two embedded antennas, with independent function, in a wireless communication device, are operated at the same time, pattern overlap, interference from radiation energy, shift of characteristic impedance, electrical characteristics, etc., must also be properly considered, where the control of the pattern of the antennas is the major factor which should be took into account.

SUMMARY OF THE INVENTION

Accordingly, an object of the invention is to provide two antennas operated in a dual-band system (WLAN802.11a and WLAN802.11b) for a wireless communication device to transmit signals simultaneously. Two independent antennas are embedded in the wireless communication device, such that performance is increased and the interference between the two systems (WLAN802.11a and WLAN802.11b) is effectively reduced. Owing to 2.4 GHz/5 GHz dual-band radio frequency circuits of the wireless communication device being operated at the same time, the RF circuits of dual-band are independent with each other, the antenna direction and the isolation of harmonic wave between the two antennas are substantially balanced.

The wireless communication device of the invention provides balance between the two systems (WLAN802.11a operated at 5.15~5.35 GHz, 5.475~5.725 GHz, 5.725~5.825 GHz and WLAN802.11b operated at 2.4~2.5 GHz) when they transmit signals at the same time. In general, when transmission distance is a predetermined constant, propagation loss provided by the radiation of 5 GHz exceed that of the radiation of 2.4 GHz. In the wireless communication device of this invention, the equivalent gain provided by the radiation of 5 GHz exceeds that of the radiation of 2.4 GHz, such that the qualities of transmission of the two systems are consistent with each other.

Another object of the invention is to provide a wireless communication device having two independent antenna units isolated by a shielding unit, such that the wireless communication device meets the specification of EMC (Electromagnetic Compatibility).

Another object of the invention is to provide a wireless communication device having metallic shielding and two antenna units, such that the performance of the electrical characteristics of the broadcasting system is increased, the interference between the two antenna units is effectively reduced, and the two antenna units are both provided with a quasi-omnidirectional pattern of radiation.

Another object of the invention is to provide a wireless communication device having two antenna units with balanced transmission quality. For example, base on the nature of electromagnetism, the propagation loss provided by the radiation of 5 GHz exceed that of the radiation of 2.4 GHz.

The invention design that the equivalent gain of 2.4 GHz antenna unit is approximately 0.55 dBi and of the 5 GHz antenna unit, approximately 1.77 dBi, such that quality of transmission of the two systems are consistence with each other.

The invention provides an embedded dual-band antenna system for a wireless communication device to transmit signals simultaneously. The wireless communication device has a body, a housing, a shielding unit, a first antenna unit, a second antenna unit and a control unit. The shielding unit, the first antenna unit and the second antenna unit are disposed in the body, and the shielding unit, the first antenna unit and the second antenna unit are enclosed by the housing. The second antenna unit is separated from the first antenna unit by the shielding unit. The first antenna unit transmits a first signal and the second antenna unit transmits a second signal respectively. In a predetermined interval, the first signal and the second signal are transmitted simultaneously.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
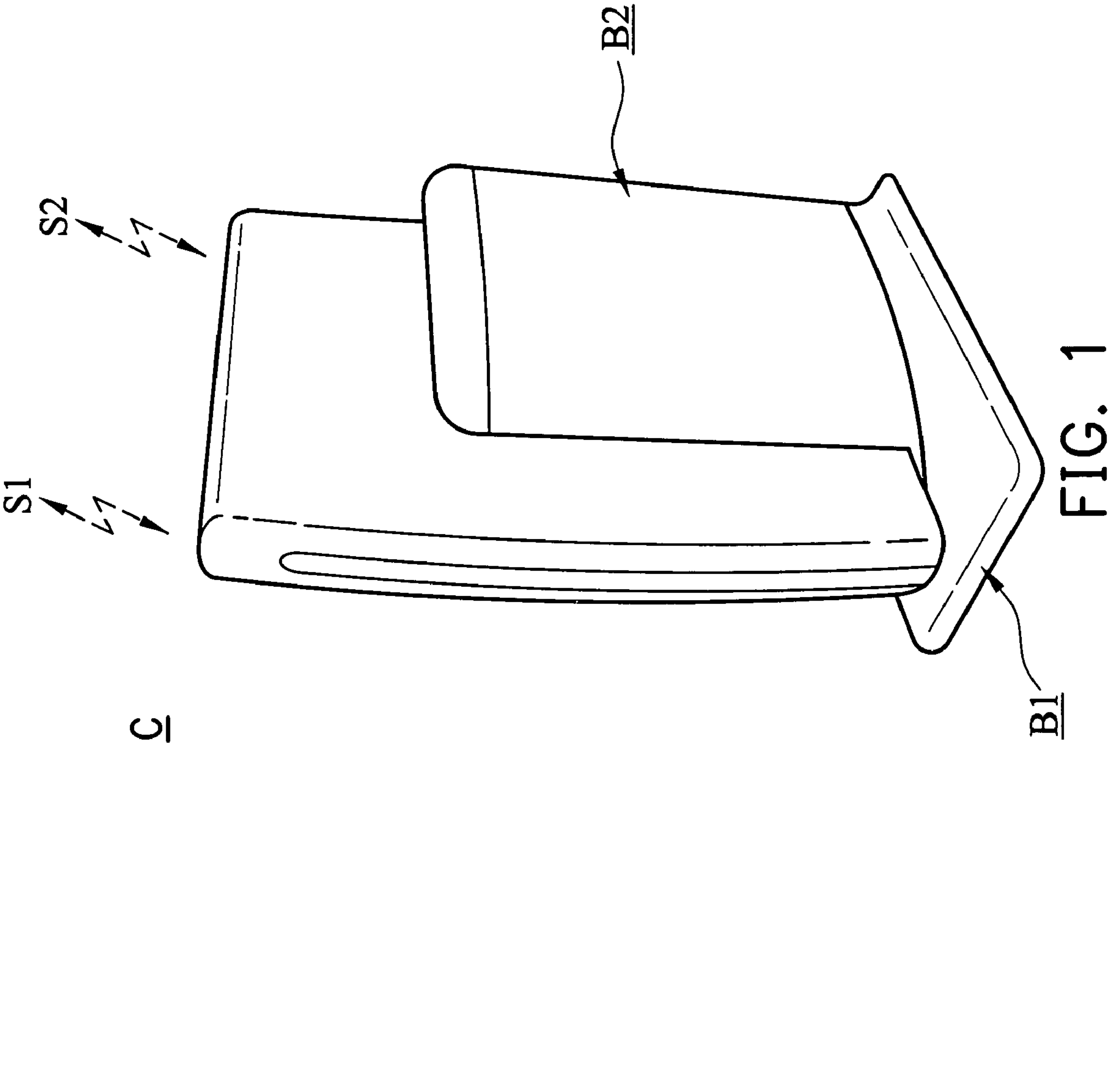
FIG. 1 is a perspective view of a wireless communication device (C)

In FIG. 1, a wireless communication device C of the invention has an embedded dual-band antenna system transmitting a first signal S1 and a second signal S2 simultaneously. The first signal S1 and the second signal S2 have two different specifications. For example, the first signal S1 and the second signal S2 can respectively meet 802.11a and 802.11b standards.

In this preferred embodiment, the wireless communication device C is a wireless network access point, especially suitable for application in a Personal Digital Assistant (PDA), mobile phone, or a system or device with at least two signals being transmitted.

Figure 2B:
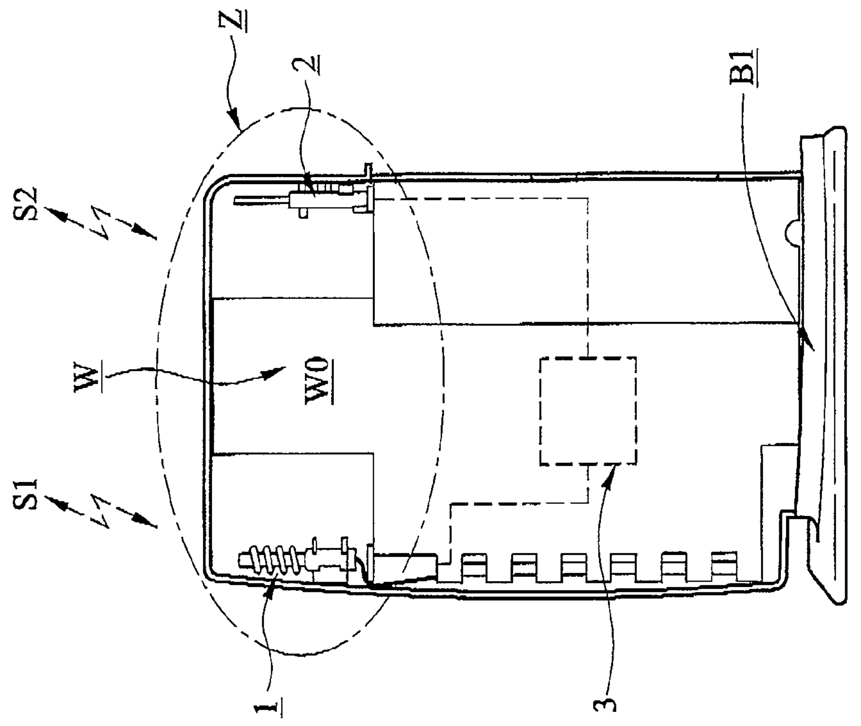
FIG. 2B is an inner view of the wireless communication device (C) of FIG. 2A, wherein the wireless communication device (C) has a shielding unit (W), a first antenna unit (1) and a second antenna unit (2)
Figure 2A:
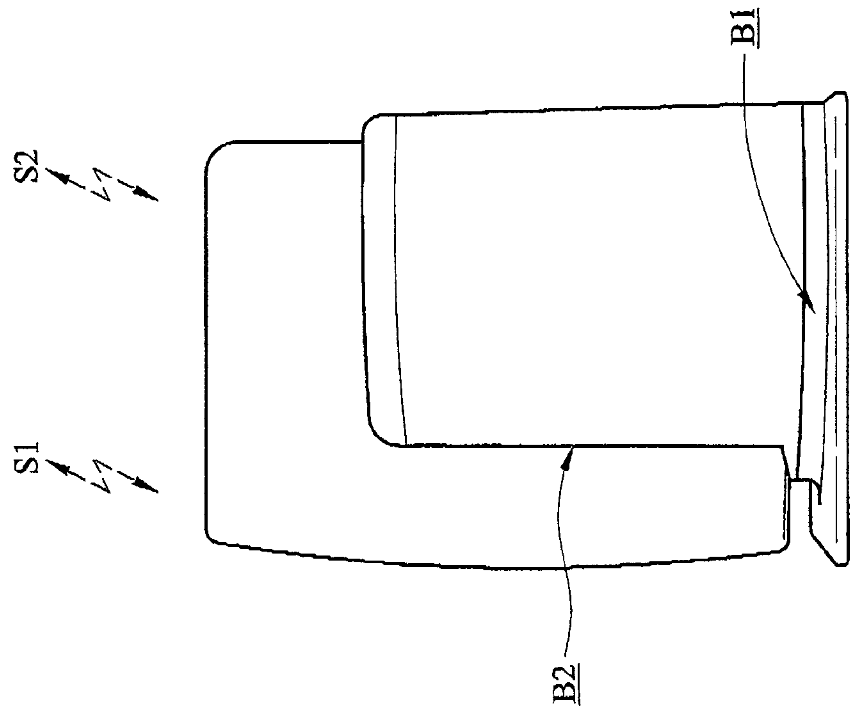
FIG. 2A is a side view of the wireless communication device (C) in FIG. 1.

In FIGS. 2A and 2B, the wireless communication device C has a body B1, a housing B2, a shielding unit W, a first antenna unit 1, a second antenna unit 2, a control unit 3. The shielding unit W, the first antenna unit 1 and the second antenna unit 2 are disposed in the body B1. The body B1 is enclosed by the housing B2, i.e., the shielding unit W, the first antenna unit 1 and the second antenna unit 2 are also enclosed by the housing B2. The first antenna unit 1 and the second antenna unit 2 are electronically connected to the control unit 3, and the second antenna unit 2 is isolated from the first antenna unit 1 by the shielding unit W. The first antenna unit 1 transmits a first signal S1 and the second antenna unit 2 transmits a second signal S2 respectively. With the control unit 3, the first signal S1 transmitted by the first antenna unit 1 and the second signal S2 transmitted by the second antenna unit 2 can overlap at a designated time.

An interval between a first time T1 and a second time T2 of the first signal S1 is defined as a first time section. An interval between a third time T3 and a fourth time T4 of the second signal S2 is defined as a second time section.

When the first signal S1 and the second signal S2 are transmitted, an overlapping time section area is formed by the first time section and the second time section and defined as a predetermined interval ΔT. That is to say, the first signal S1 and the second signal S2 are simultaneously transmitted in the predetermined interval ΔT.

There are four possibilities for the predetermined interval ΔT to be formed, in the first time T1, the second time T2, the third time T3, or the fourth time T4. When the third time T3, or the fourth time T4 is located between the first time T1 and the second time T2, the predetermined interval ΔT can be formed by (a1)–(a4) as follows, (a1) from the first time T1 to the fourth time T4, (a2) from the first time T1 to the third time T3, (a3) from the second time T2 to the fourth time T4, and (a4) from the second time T2 to the third time T3.

Figure 3:
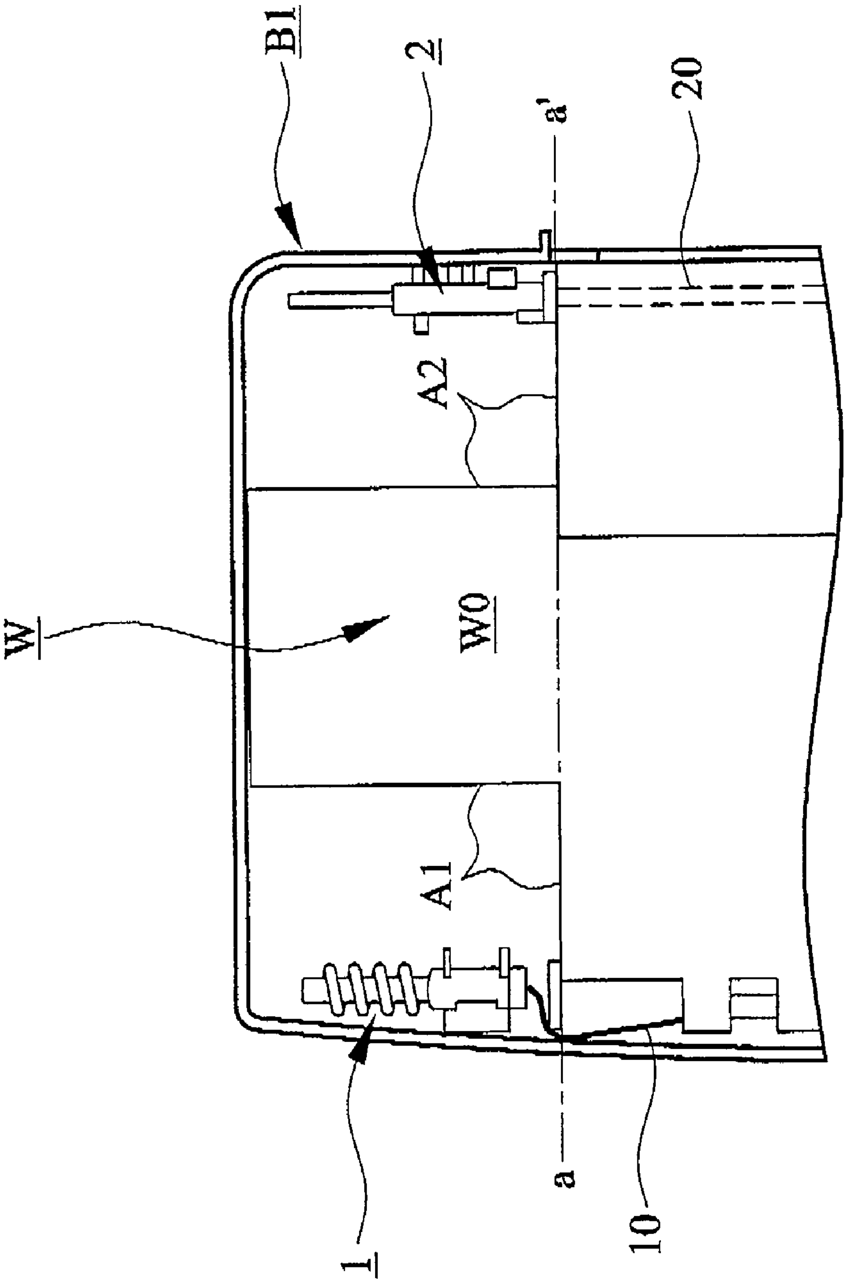
FIG. 3 is an enlarged perspective view along a dotted line (Z) in FIG. 2B.
Figure 4:
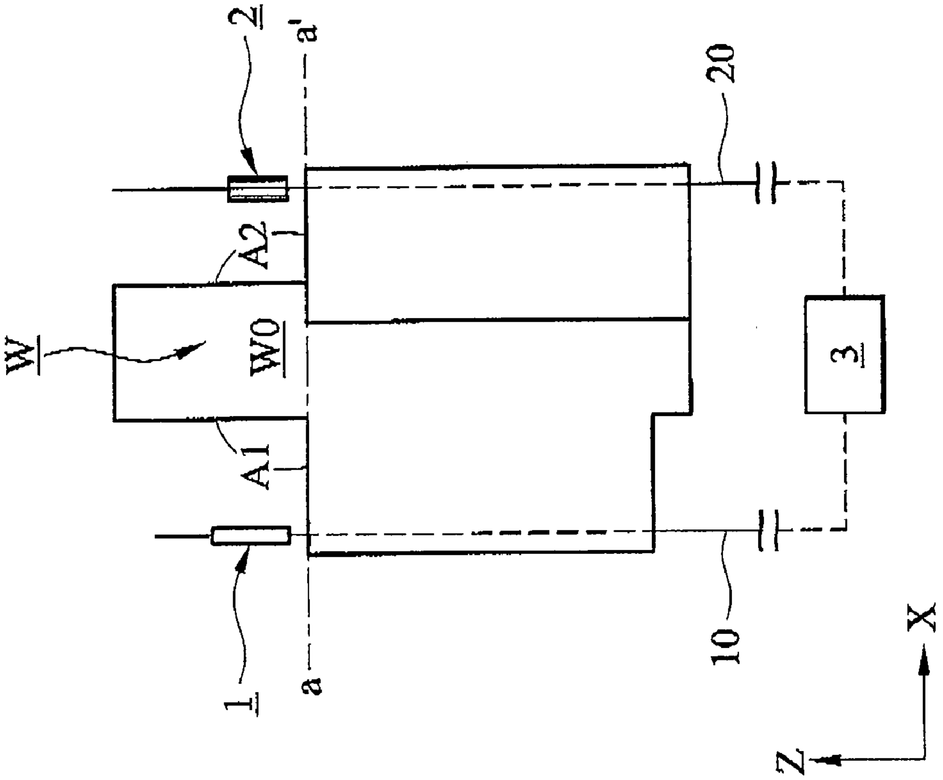
FIG. 4 is a schematic plane view of the shielding unit (W), the first antenna unit (1) and the second antenna unit (2) of the wireless communication device (C) in FIG. 3.

In FIG. 3, the first antenna unit 1 and the second antenna unit 2 are connected to the control unit 3 by two cables 10, 20, respectively, such that the first signal S1 transmitted by the first antenna unit 1 and the second signal S2 transmitted by the second antenna unit 2 can be modulating and demodulating via control unit 3.

In this embodiment, the first antenna unit 1 is a 2.4 GHz internal dipole antenna, and the second antenna unit 2 is a 5 GHz internal dipole antenna.

With the isolation of the shielding unit W disposed between the first antenna unit 1 and the second antenna unit 2, problems such as signal overlap, interference, etc., can be avoided between the first signal S1 and the second signal S2.

The shielding unit W has an extruded portion W0, a first ground plane A1 formed on the extruded portion W0, and a second ground plane A2 formed on the extruded portion W0 in opposite to the first ground plane A1. In this embodiment, each of the first and second ground planes A1 and A2 have similar L-shapes, and the area of the first L-shaped ground plane A1 is unequal to that of the second L-shaped ground plane A2. With respect to the shielding unit W, the first ground plane A1 is connected to the first antenna unit 1 and the second ground plane A2 is connected to the second antenna unit 2.

Figure 5A:
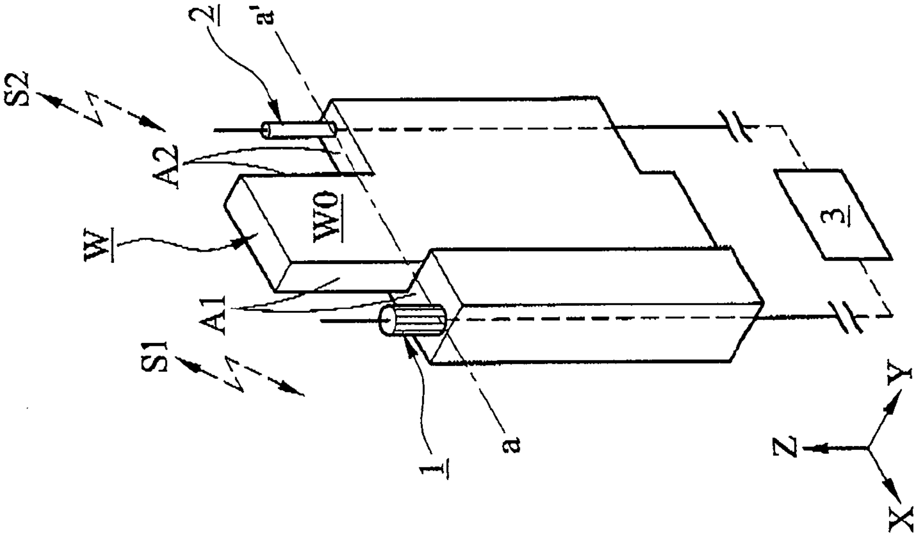
FIG. 5A is a schematic perspective view of the shielding unit (W), the first antenna unit (1) and the second antenna unit (2) of the wireless communication device (C) in FIG. 3.
Figure 5B:
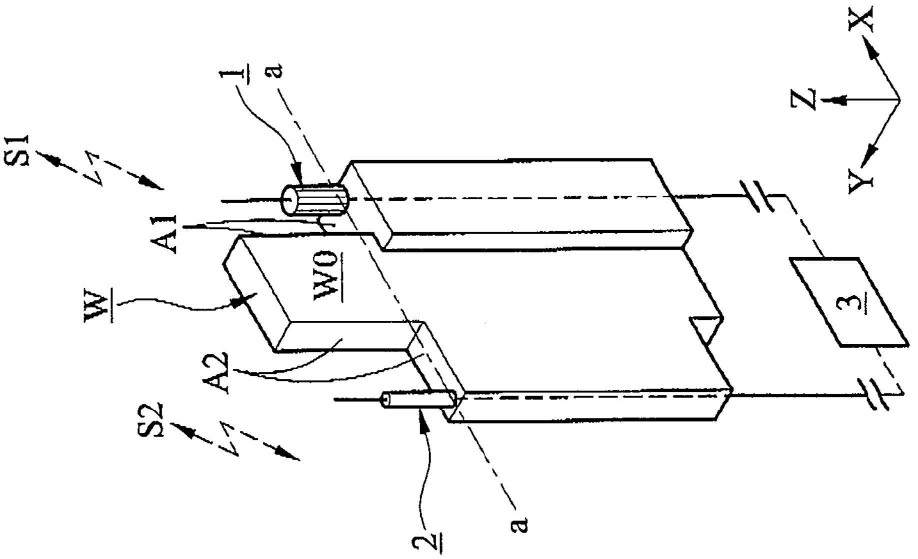
FIG. 5B is another schematic perspective view of the shielding unit (W), the first antenna unit (1) and the second antenna unit (2) of the wireless communication device (C) in FIG. 3.

In FIGS. 5A and 5B, the shielding unit W, the first antenna unit 1 and the second antenna unit 2 of the wireless communication device C are defined on a reference coordinate system X-Y-Z. The longitudinal directions of the first antenna unit 1 and the second antenna unit 2 are substantially parallel, defined by an axis Z of the reference coordinate system X-Y-Z. A line a-a' connects the first antenna unit 1 to the second antenna unit 2, defined by a reference plane XY of the reference coordinate system X-Y-Z. Both the first ground plane A1 and the second ground plane A2 are defined by two reference planes XY, YZ of the reference coordinate system X-Y-Z.

With respect to the line a-a' and a far-field position, the energy formed by the first signal Sl of 2.4 GHz and the energy formed by the second signal S2 of 5 GHz are equivalent, i.e., with the effect of the shielding unit W, the first ground plane A1 and the second ground plane A2, the first antenna unit 1 has the same radiation region as that of the second antenna unit 2, and transmission quality of both the first antenna unit 1 and the second antenna unit 2 are substantially equal. A far-field position (an observation point, not shown) is defined to observe the reflecting effects of the wireless communication device C. A first reflecting effect is formed by the first signal S1 reflected by the first ground plane A1, and a second reflecting effect is formed by the second signal S2 reflected by the second ground plane A2. The first reflecting effect is equivalent to the second reflecting effect.

That is to say, with respect to the shielding unit W, the first antenna unit 1 is provided with a first parameter Ml and the second antenna unit 2 is provided with a second parameter M2, such that the first antenna unit 1 generates a first energy E1 by adjusting the first parameter M1 and the second antenna unit 2 generates a second energy E2 by adjusting the second parameter M2. The first energy E1 is substantially equal to the second energy E2 as the first signal S1 and the second signal S2 transmitted via the first antenna unit 1 and the second antenna 2 simultaneously in the predetermined interval ΔT.

When transmitting the first signal S1 and the second signal S2, the first antenna unit 1 is provided with a first transmission loss L1 and the second antenna unit 2 is provided with a second transmission loss L2. By adjusting the ratio of area between the first ground plane A1 and the second ground plane A2, the ratio of gain between the first antenna unit 1 and the second antenna unit 2 can be adjusted to a constant, such that the first transmission loss L1 of the first antenna unit 1 and the second transmission loss L2 of the second antenna unit 2 are substantially balanced. That is to say, the difference between the first transmission loss L1 and the second transmission loss L2 can be eliminated by adjusting the first ground plane A1 and the second ground plane A2.

In general, the equivalent gain refers to an integral effect of an antenna unit embedded in a wireless communication device, and it is to be understood that the gain of the antenna unit constantly changes in the wireless communication device. Thus, the invention provides a method of increasing equivalent gain by adjusting the size of the ground plane.

For example, the first antenna unit 1 can be a 2.4 GHz internal dipole antenna with a first equivalent gain, and the second antenna unit 2 is a 5 GHz internal dipole antenna with a second equivalent gain. When the first equivalent gain of the first antenna unit 1 is approximately equal to 0.55 dBi, the second equivalent gain of the second antenna unit 2 is approximately adjusted to 1.77 dBi. Thus, the difference between the first transmission loss L1 and the second transmission loss L2 is eliminated, i.e., when the second transmission loss L2 of the second antenna unit 2 is greater than the first transmission loss L1 of the first antenna unit 1, both the first antenna unit 1 and the second antenna unit 2 can have the same quality of transmission by allowing the second equivalent gain of the second antenna unit 2 to exceed the first equivalent gain of the first antenna unit 1.

Figure 6A:
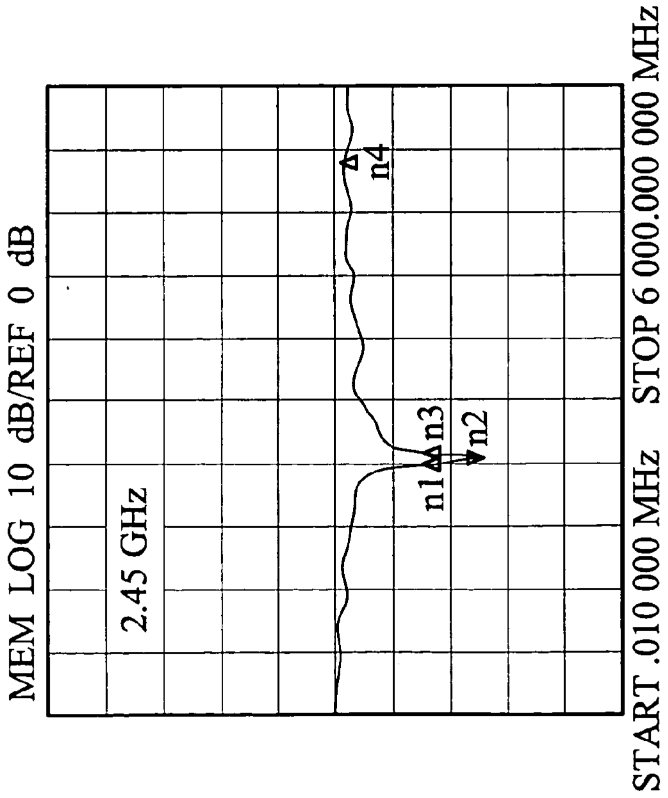
FIG. 6A shows test results of return loss measured from a first antenna unit (1), a 2.4 GHz internal dipole antenna, of the wireless communication device (C)

In FIG. 6A, symbols “n1”, “n2”, “n3”, and “n4” respectively show the return loss of the first antenna unit 1 (2.4 GHz internal dipole antenna) measured on four different sites. Site “n2”, where the first antenna unit 1 is operated at 2.45 GHz, has measured data of −25.422 dB and the return loss is 25.422 dB. Site "n1", where the first antenna unit 1 is operated at 2.4 GHz, has measured data of −15.437 dB and the return loss is 15.437 dB. Site "n3", where the first antenna unit 1 is operated at 2.5 GHz, has measured data of −15.267 dB and the return loss is 15.267 dB. Based on the results of sites "n2", "n1" and "n3", it is to be understood that performance of the first antenna unit 1 is high and satisfies the requirements of standard. Site "n4", where the first antenna unit 1 is operated at 5.25 GHz, has measured data of −1.5915 dB and the return loss is 1.5915 dB. The results of site "n4" are for reference.

Figure 6B:
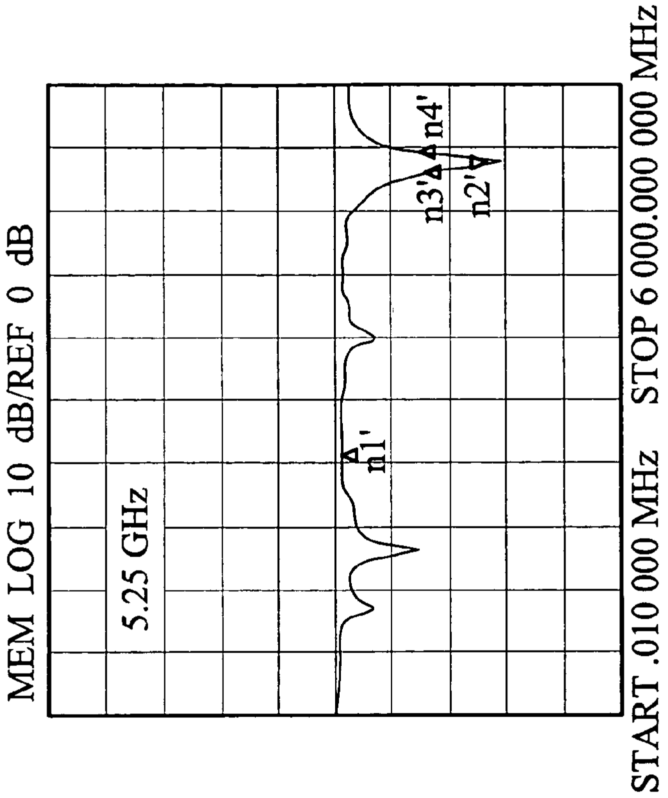
FIG. 6B shows test results of return loss measured from a second antenna unit (2), a 5 GHz internal dipole antenna, of the wireless communication device (C)

In FIG. 6B, symbols n1', n2', n3', and n4' respectively show the return loss of the second antenna unit 2 (5 GHz internal dipole antenna) measured on four different sites. Site n3', where the second antenna unit 2 is operated at 5.25 GHz, has measured data of −26.647 dB and the return loss is 26.647 dB. Site n2', where the second antenna unit 2 is operated at 5.15 GHz, has measured data of −16.007 dB and the return loss is 16.007 dB. Site n4', where the second antenna unit 2 is operated at 5.35 GHz, has measured data of −15.267 dB and the return loss is 15.267 dB. Based on the results of sites n3', n2', and n4', it is to be understood that performance of the second antenna unit 2 is high and satisfies the requirements of standard. Site n1', where the second antenna unit 2 is operated at 5 GHz, has measured data of −1.0966 dB and the return loss is 1.0966 dB. The results of site n1' are for reference.

Figure 7:
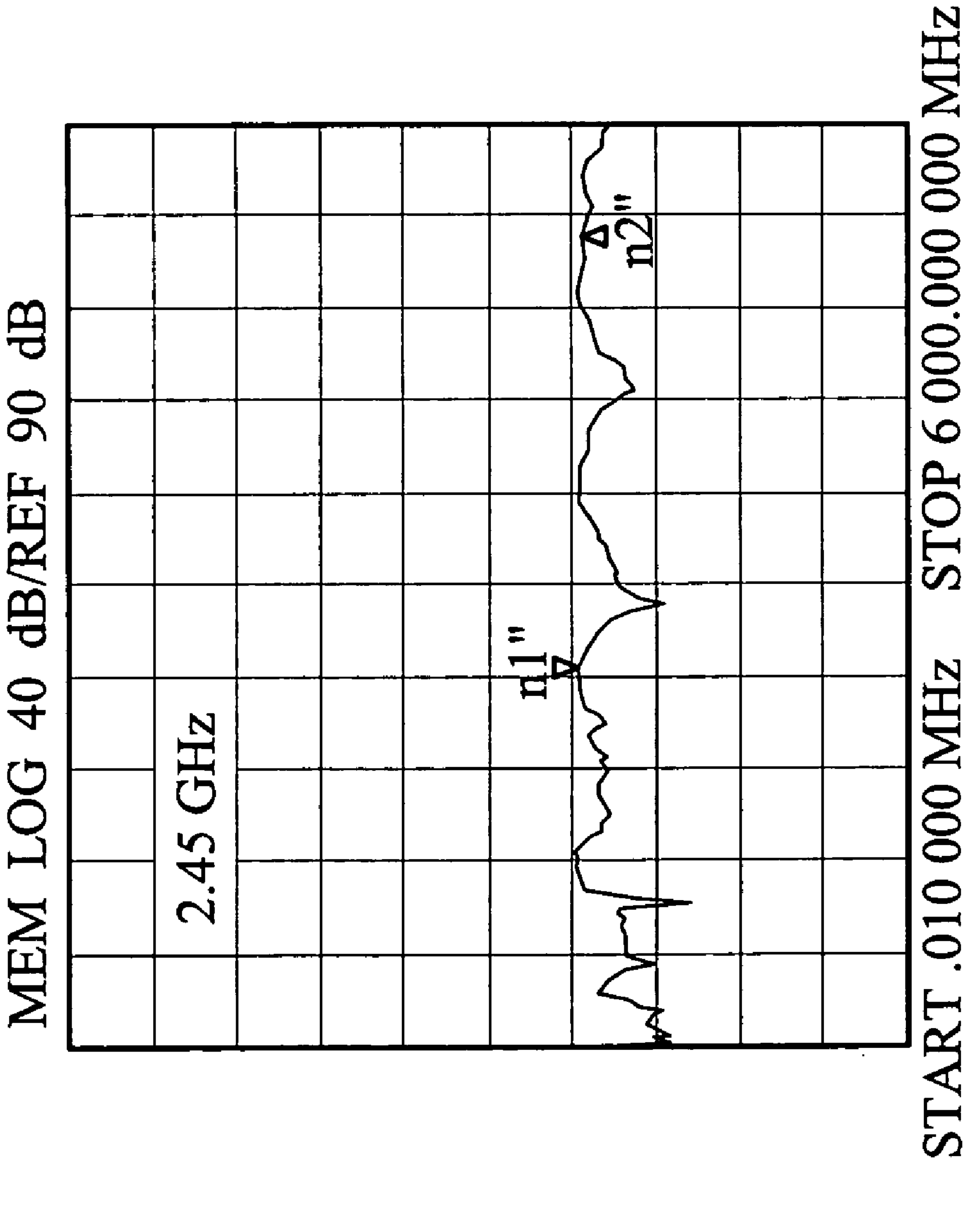
FIG. 7 shows test results of isolation measured between the first antenna unit (1) and the second antenna unit (2) of the wireless communication device (C).

In FIG. 7, symbols n1" and n2" respectively show the electrical isolation of high frequency measured between the first antenna unit 1 and the second antenna unit 2 on two different sites. Site n1", where the first antenna unit 1 and the second antenna unit 2 are operated at 2.45 GHz, has measured data of 32 dB, and Site n2", where the first antenna unit 1 and the second antenna unit 2 are operated at 5.25 GHz, has measured data of 35 dB. It is noted that the wireless communication device C of the invention, operated within the range of DC~6 GHz, provides the electrical isolation of high frequency not less than 30 dB.

TABLE 1

(Unit: dBi)
Results of gain measured from the first antenna unit 1 (2.4 GHz internal dipole antenna)

| Plane | Frequency (GHz) | 2.40 | 2.45 | 2.50 |
|---|---|---|---|---|
| XY plane | Peak Gain | 0.47 | 0.44 | 1.05 |
| | Average Gain | −1.53 | −1.00 | −1.49 |
| YZ plane | Peak Gain | 0.64 | 1.18 | 1.00 |
| | Average Gain | −2.65 | <2.98 | <3.49 |
| XZ plane | Peak Gain | −0.01 | 0.16 | 0.02 |
| | Average Gain | −3.84 | −4.13 | −4.88 |

The results of peak gain and average gain of the first antenna unit 1 operated at 2.40 GHz, 2.45 GHz, 2.50 GHz on three reference planes XY, YZ, XZ are shown in Table 1. In FIGS. 5A and 5B, it is to be understood that the gain on reference planes XY, YZ of the first antenna unit 1 are superior to those on the reference plane XZ, such that the effective area of the first antenna unit 1 is expanded and extended to more regions on each plane. The first antenna unit 1 of the invention provides high performance and utility.

TABLE 2

(Unit: dBi)
Results of gain measured from the second antenna unit 2 (5 GHz internal dipole antenna)

| Plane | Frequency (GHz) | 5.15 | 5.25 | 5.35 |
|---|---|---|---|---|
| XY plane | Peak Gain | 2.16 | 2.36 | 1.62 |
| | Average Gain | −0.64 | −0.84 | −1.93 |
| YZ plane | Peak Gain | 2.27 | 3.27 | 1.96 |
| | Average Gain | −3.94 | −2.96 | −4.39 |
| XZ plane | Peak Gain | 1.36 | 1.19 | −0.34 |
| | Average Gain | −2.94 | −3.31 | −5.15 |

The results of peak gain and average gain of the second antenna unit 2 operated at 5.15 GHz, 5.25 GHz, 5.35 GHz on three reference planes XY, YZ, XZ are shown in Table 2. It is to be understood that the gain on reference planes XY, YZ of the second antenna unit 2 are superior to those on the reference plane XZ, such that the effective area of the second antenna unit 2 can be expanded and extended to more regions on each plane. The second antenna unit 2 provides high performance and utility as the first antenna unit 1.

Signals transmitted by the wireless communication device C of the invention are operated at a dual-band system (2.4 GHz and 5 GHz). Two circuits for the first antenna unit 1 and the second antenna unit 2 of the dual-band RF system of the wireless communication device C are independent, and the first antenna unit 1 is isolated from the second antenna unit 2 by the shielding unit W, such that electromagnetic energy transmitted from the first antenna unit 1 is separated from that of the second antenna unit 2. By separating the first antenna unit 1 from the second antenna unit 2 with the shielding unit W, the electrical characteristics of the broadcasting system of the wireless communication device C are increased, and the interference between the first antenna unit 1 and the second antenna unit 2 is reduced. Further, both the first antenna unit 1 and the second antenna unit 2 are provided with a pattern of quasi-omnidirectional radiation qualified on the requirements of antenna direction and isolation of harmonic wave, and also both have consistent qualities of propagation in communication.

While the invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. A wireless communication device, comprising:

a shielding unit;

a first antenna unit transmitting a first signal between a first time and a second time; and a second antenna unit separated from the first antenna unit by the shielding unit, transmitting a second signal between a third time and a fourth time, wherein the shielding unit is located between the first antenna unit and the second antenna unit, and the third time or the fourth time occurs between the first time and the second time to form a predetermined interval in which the first signal and the second signal are simultaneously transmitted.

2. The wireless communication device as claimed in claim 1, wherein the first antenna unit is provided with a first parameter with respect to the shielding unit and the second antenna unit is provided with a second parameter with respect to the shielding unit, such that the first antenna unit generates first energy by adjusting the first parameter and the second antenna unit generates second energy by adjusting the second parameter and the first energy is substantially equivalent to the second energy.

3. The wireless communication device as claimed in claim 1 further comprising a first ground plane connected to the first antenna unit with respect to the shielding unit, a second ground plane connected to the second antenna unit with respect to the shielding unit and a far-field position used as an observation point to observe a first reflecting effect formed by the first signal reflected by the first ground plane and a second reflecting effect formed by the second signal reflected by the second ground plane and equivalent to the first reflecting effect.

4. The wireless communication device as claimed in claim 1, wherein the first antenna unit and the second antenna unit are dipole antennas.

5. The wireless communication device as claimed in claim 1, wherein the first antenna unit is a 2.4 GHz internal dipole antenna and the second antenna unit is a 5 GHz internal dipole antenna.

6. The wireless communication device as claimed in claim 1 further comprising a first ground plane connected to the first antenna unit, a second ground plane connected to the second antenna unit, wherein the first antenna unit is provided with a first transmission loss and the second antenna unit is provided with a second transmission loss, and difference between the first transmission loss and the second transmission loss is compensated by the first ground plane and the second ground plane.

7. The wireless communication device as claimed in claim 1, wherein the first antenna unit is a 2.4 GHz internal dipole antenna and the second antenna unit is a 5 GHz internal dipole antenna, and a second equivalent gain of the second antenna unit is approximately equal to 1.77 dBi when a first equivalent gain of the first antenna unit is approximately equal to 0.55 dBi.

8. A wireless communication device, comprising:

a shielding unit;

a first antenna unit transmitting a first signal;

a second antenna unit separated from the first antenna unit by the shielding unit, transmitting a second signal, wherein the first signal and the second signal are simultaneously transmitted, wherein the shielding unit is located between the first antenna unit and the second antenna unit; and a control unit electronically connected to the first antenna unit and the second antenna unit, modulating and demodulating the first signal and the second signal.

9. The wireless communication device as claimed in claim 8, wherein the first antenna unit is provided with a first parameter with respect to the shielding unit and the second antenna unit is provided with a second parameter with respect to the shielding unit, such that the first antenna unit generates first energy by adjusting the first parameter and the second antenna unit generates second energy by adjusting the second parameter and the first energy is substantially equivalent to the second energy.

10. The wireless communication device as claimed in claim 8 further comprising a first ground plane connected to the first antenna unit with respect to the shielding unit and a second ground plane connected to the second antenna unit with respect to the shielding unit, wherein the first antenna unit is provided with a first transmission loss and the second antenna unit is provided with a second transmission loss, and a difference between the first transmission loss and the second transmission loss is compensated by the first ground plane and the second ground plane.

11. The wireless communication device as claimed in claim 8, wherein the first antenna unit and the second antenna unit are dipole antennas.

12. The wireless communication device as claimed in claim 8, wherein the first antenna unit is a 2.4 GHz internal dipole antenna and the second antenna unit is a 5 GHz internal dipole antenna.

13. The wireless communication device as claimed in claim 8 further comprising a first ground plane connected to the first antenna unit, a second ground plane connected to the second antenna unit, wherein the first antenna unit is provided with a first transmission loss and the second antenna unit is provided with a second transmission loss, and a difference between the first transmission loss and the second transmission loss is compensated by the first ground plane and the second ground plane.

14. The wireless communication device as claimed in claim 8, wherein the first antenna unit is a 2.4 GHz internal dipole antenna and the second antenna unit is a 5 GHz internal dipole antenna, and a second equivalent gain of the second antenna unit is approximately equal to 1.77 dBi when a first equivalent gain of the first antenna unit is approximately equal to 0.55 dBi.

15. The wireless communication device as claimed in claim 1, wherein the first and second ground planes are formed in L-shapes, and the area of the first ground plane is unequal to that of the second ground plane.

16. The wireless communication device as claimed in claim 8, wherein the first and second ground planes are formed in L-shapes, and the area of the first ground plane is unequal to that of the second ground plane.

17. A wireless communication device, comprising:

a shielding unit comprising an extruded portion, a first L-shaped ground plane formed on the extruded portion and a second L-shaped ground plane formed on the extruded portion;

a first antenna unit transmitting a first signal between a first time and a second time, connected to the first L-shaped first ground plane; and a second antenna unit separated from the first antenna unit by the shielding unit and connected to the second L-shaped ground plane, transmitting a second signal between a third time and a fourth time, wherein the shielding unit is located between the first antenna unit and the second antenna unit, and the third time or the fourth time occurs between the first time and the second time to form a predetermined interval in which the first signal and the second signal are simultaneously transmitted.

18. The wireless communication device as claimed in claim 17, wherein the first and second L-shaped ground planes are in opposite.

19. The wireless communication device as claimed in claim 17, wherein the area of the first L-shaped ground plane is unequal to that of the second L-shaped ground plane.

20. The wireless communication device as claimed in claim 17, wherein the ratio of gain between the first antenna unit and the second antenna unit is a constant by adjusting the ratio of area between the first ground plane and the second ground plane.

* * * * *